United States Patent
Ando et al.

(10) Patent No.: US 10,203,015 B2
(45) Date of Patent: Feb. 12, 2019

(54) DUST BOOT, METHOD OF MANUFACTURING DUST BOOT, AND SHOCK ABSORBER

(71) Applicants: KYB Corporation, Tokyo (JP); HONDA MOTOR CO., LTD., Tokyo (JP)

(72) Inventors: Kazuma Ando, Gifu (JP); Masahiro Miwa, Gifu (JP); Yasutaka Ohta, Saitama (JP); Koji Takami, Saitama (JP)

(73) Assignees: KYB Corporation, Tokyo (JP); HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/126,562

(22) PCT Filed: Mar. 17, 2015

(86) PCT No.: PCT/JP2015/057919
§ 371 (c)(1),
(2) Date: Sep. 15, 2016

(87) PCT Pub. No.: WO2015/146720
PCT Pub. Date: Oct. 1, 2015

(65) Prior Publication Data
US 2017/0089419 A1 Mar. 30, 2017

(30) Foreign Application Priority Data
Mar. 28, 2014 (JP) .................................. 2014-067925

(51) Int. Cl.
*F16F 9/38* (2006.01)
*B29C 49/48* (2006.01)
(Continued)

(52) U.S. Cl.
CPC ................ *F16F 9/38* (2013.01); *B29C 49/48* (2013.01); *B29D 35/12* (2013.01); *B60G 15/063* (2013.01);
(Continued)

(58) Field of Classification Search
CPC .. F16F 9/38; F16F 2226/04; F16F 2230/0023; B62D 35/12; B62D 35/128;
(Continued)

(56) References Cited

U.S. PATENT DOCUMENTS

2006/0076751 A1* 4/2006 Koumura ............. B60G 15/063
280/124.154
2007/0187197 A1 8/2007 Imaeda et al.
(Continued)

FOREIGN PATENT DOCUMENTS

EP 2070738 A2 6/2009
EP 2690308 A2 1/2014
(Continued)

*Primary Examiner* — Melanie Torres Williams
(74) *Attorney, Agent, or Firm* — Hauptman Ham, LLP

(57) ABSTRACT

A dust boot includes a tubular boot body and an annular flange portion linked to an upper end of the boot body. In an outer side of the flange portion, an angle between the flange portion and a line perpendicular to an axis of the boot body is set to be larger than 0° and smaller than 90°.

5 Claims, 3 Drawing Sheets

(51) Int. Cl.
  *B29D 35/12* (2010.01)
  *B60G 15/06* (2006.01)
  *B29C 49/24* (2006.01)

(52) U.S. Cl.
  CPC .... *B60G 15/065* (2013.01); *B29C 2049/2427* (2013.01); *B60G 2202/312* (2013.01); *B60G 2202/32* (2013.01); *B60G 2204/1242* (2013.01); *B60G 2204/40* (2013.01); *B60G 2204/45021* (2013.01); *F16F 2224/02* (2013.01); *F16F 2226/04* (2013.01); *F16F 2230/0023* (2013.01)

(58) Field of Classification Search
  CPC ........... B60G 15/063; B60G 15/065; B60G 2202/312; B60G 2202/32; B60G 2204/1242
  See application file for complete search history.

(56) References Cited

U.S. PATENT DOCUMENTS

| | | |
|---|---|---|
| 2009/0145707 A1 | 6/2009 | Henneberg et al. |
| 2011/0156327 A1* | 6/2011 | Nobusue ............... B60G 7/04 267/153 |
| 2014/0027218 A1 | 1/2014 | Zietsch et al. |
| 2014/0035232 A1* | 2/2014 | Matsumura ............ F16F 9/38 277/345 |

FOREIGN PATENT DOCUMENTS

| | | |
|---|---|---|
| GB | 2335477 A | 9/1999 |
| JP | H03-223535 A | 10/1991 |
| JP | H08-177941 A | 7/1996 |
| JP | H11-264433 A | 9/1999 |
| JP | 2005-265154 A | 9/2005 |
| JP | 2007-211949 A | 8/2007 |
| JP | 2009-56852 A | 3/2009 |
| JP | 2012-219825 A | 11/2012 |

* cited by examiner

DUST BOOT, METHOD OF MANUFACTURING DUST BOOT, AND SHOCK ABSORBER

TECHNICAL FIELD

The present invention relates to a dust boot, a method of manufacturing the dust boot, and a shock absorber.

BACKGROUND ART

In many cases, external components such as a shock absorber interposed between sprung and unsprung members of a vehicle are operated while they are exposed to the external air at all times. Pollutants such as dust, dirt, or muddy water are attached to the external components such as a shock absorber used in the exposed state in this manner.

If pollutants such as dust, dirt, or muddy water are attached to a sliding portion in a rod that moves into and out of a cylinder, the pollutants may hinder lubrication of the sliding portion or promote deterioration of a sealing member used to seal the sliding portion. For this reason, a dust boot is provided in the external components such as a shock absorber in order to protect the sliding portion from dust, dirt, or the like.

More specifically, the dust boot has a tubular boot body partially provided with a bellows portion and a flange portion provided in an upper end of the boot body. The dust boot covers the sliding portion of the rod that moves into and out of the cylinder at all times by extending or contracting the bellows portion. As a result, the sliding portion of the rod is isolated from the outside of the dust boot and is protected from adhering of pollutants such as dust, dirt, or muddy water.

The dust boot is fixed to the shock absorber or the like by holding the flange portion between a suspension spring seat connected to a tip side of the rod of the shock absorber or the like and a suspension spring configured to bias the shock absorber or the like to an expansion direction (for example, see JPH11-264433 A).

SUMMARY OF INVENTION

The dust boot described above is manufactured through injection molding in which heated rubber is injected into a mold cavity having the same shape as that of the dust boot. The mold cavity is formed between an inner mold and a pair of halved outer molds.

In this manner, the injection molding requires the inner and outer molds. This generates some disadvantages such as an expensive manufacturing cost and an increase of man-hours in fabrication of the molds.

As a method of manufacturing hollow parts at a low cost, blow molding may be employed. In the blow molding, air is blown into a hollow of a tubular material to press the material into the mold.

However, when a shape of the dust boot in which the flange portion is perpendicularly linked to the boot body as described above is formed through blow molding, the thickness of the flange portion becomes thin. Therefore, the strength of the flange portion may not be enough to allow holding between the suspension spring and the spring seat.

The present invention aims to provide a dust boot capable of securing the strength even through blow molding.

According to one aspect of the present invention, a dust boot includes: a tubular boot body provided with an extendable/contractible bellows portion and configured to cover a rod that moves into and out of a cylinder of a shock absorber; and an annular flange portion linked to an upper end of the boot body and held between a rod-side spring seat installed in the rod and a suspension spring disposed in an outer circumference of the shock absorber. An angle between the flange portion and a line perpendicular to an axis of the boot body in an outer side of the flange portion is set to be larger than 0° and smaller than 90°.

DESCRIPTION OF EMBODIMENTS

Embodiments of the present invention will now be described with reference to the accompanying drawings.

Figure 1:
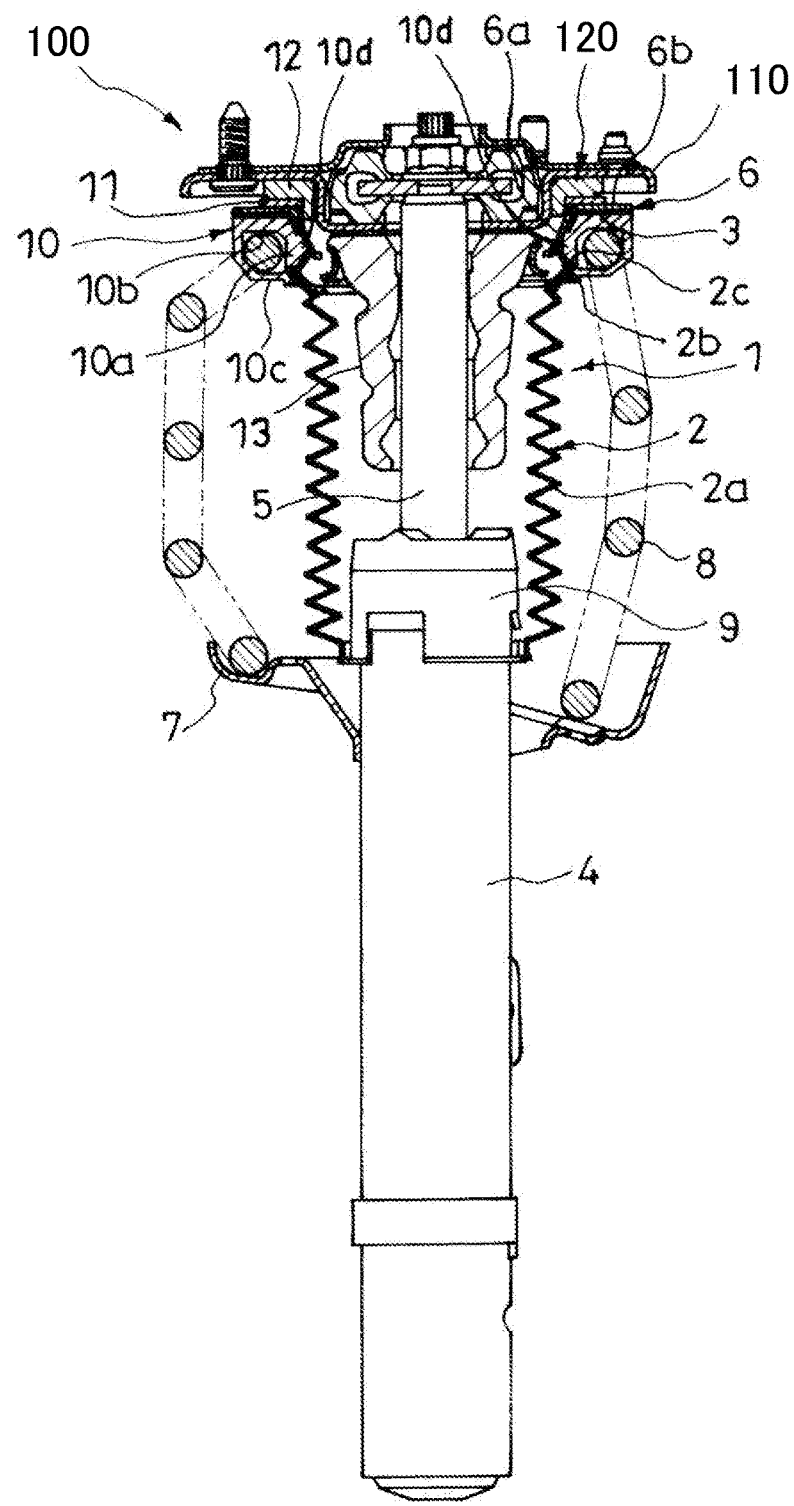
FIG. 1 is a side view illustrating a shock absorber provided with a dust boot according to an embodiment of the invention.

As illustrated in FIG. 1, the shock absorber 100 includes a cylinder 4, a rod 5 configured to move into and out of the cylinder 4, a rod-side spring seat 6 installed in the rod 5, a cylinder-side spring seat 7 installed in the cylinder 4, a suspension spring 8 interposed between the rod-side spring seat 6 and the cylinder-side spring seat 7 and disposed in the outer circumferential sides of the cylinder 4 and the rod 5, and a dust boot 1.

The dust boot 1 has a tubular boot body 2 provided with a partially extendable/contractible bellows portion 2a and an annular flange portion 3 linked to an upper end of the boot body 2.

The dust boot 1 is installed in the rod 5 by holding the flange portion 3 between the rod-side spring seat 6 and the suspension spring 8. The dust boot 1 covers the rod 5 while the boot body 2 is disposed in the outer circumferential side of the rod 5.

The cylinder 4 is partitioned into an extension-side chamber and a contraction-side chamber by a piston (not shown) slidably inserted into the inside. A liquid is filled in the extension-side chamber and the contraction-side chamber.

The cylinder-side spring seat 7 is installed in the outer circumference of the cylinder 4. In addition, a cap-shaped bump stopper 9 is fixed to an upper end of the cylinder 4 in FIG. 1.

A lower end of the rod 5 is movably inserted into the cylinder 4 and is connected to the piston inside the cylinder 4. A mount 110 for mounting the shock absorber 100 onto the chassis is installed in the upper end of the rod 5 in FIG. 1.

The rod-side spring seat 6 is rotatably installed in an outer circumference of the mount 110 by interposing a bearing 120. In this manner, the rod-side spring seat 6 can be installed in the rod 5 using the mount 110. Alternatively, the rod-side spring seat 6 may be directly installed in the rod 5.

The rod-side spring seat 6 includes an inner tube 6a and an annular seat portion 6b extending from the upper end of the inner tube 6a in FIG. 1 to the outer circumference. The rod-side spring seat 6 is configured to receive a load from the suspension spring 8 on the seat portion 6b.

A slide ring 11 of the bearing 120 is installed in the upper end of the seat portion 6b in FIG. 1. In addition, a holder 12 configured to rotatably hold the slide ring 11 is installed in the mount 110 side of the seat portion 6b. The bearing 120 includes the sliding ring 11 and the holder 12.

The suspension spring 8 is a coil spring. The suspension spring 8 is interposed between the rod-side spring seat 6 and the cylinder-side spring seat 7 and is disposed in the outer circumferential sides of the cylinder 4 and the rod 5 in order to bias the cylinder 4 and the rod 5 to a mutually separating direction.

Further, a rubber seat 10 is installed in the upper end of the suspension spring 8 in FIG. 1. The rubber seat 10 includes a tubular insertion 10a inserted into the suspension spring 8, an annular seat portion 10b extending from an upper end of the insertion 10a to the outer circumferential side, and a plurality of hook portions 10c hooked from the lower end of the insertion 10a to the outer circumference of the seat portion 10b.

The rubber seat 10 can be installed in the rod-side spring seat 6 by fitting the insertion 10a to the outer circumference of the inner tube 6a of the rod-side spring seat 6. In addition, the inner circumference of the insertion 10a is provided with four protrusions 10d arranged circumferentially at equal intervals.

In order to install the rubber seat 10 in the upper end of the suspension spring 8 in FIG. 1, the wire of the suspension spring 8 is inserted into each hook portion 10c through screwing. In this manner, by inserting the wire of the suspension spring 8 into each hook portion 10c, it is possible to hold the suspension spring 8 without falling even when the suspension spring 8 is broken in the middle.

The shock absorber 100 is provided with a damping passage (not shown) through which the liquid passes between the extension-side chamber and the contraction-side chamber. The shock absorber 100 is configured to apply resistance to a flow of the liquid passing through the damping passage.

In the shock absorber 100, when the rod 5 moves into and out of the cylinder 4, the liquid flows from a compressed chamber to an expanded chamber between the extension-side chamber and the contraction-side chamber by the piston. In this case, a pressure difference is generated between the extension-side chamber and the contraction-side chamber by a pressure loss generated as the liquid passes through the damping passage. As a result, the shock absorber 100 generates a damping force corresponding to this pressure difference to suppress axial movement of the rod 5 relative to the cylinder 4.

Note that a bump stopper rubber 13 is provided on the upper outer circumference of the rod 5 in FIG. 1 beneath the mount 110 oppositely to the bump stopper 9. When the shock absorber 100 is contracted at a certain level, the bump stopper rubber 13 abuts on the bump stopper 9 and is compressed to exert an elastic force for suppressing further contraction of the shock absorber 100.

Subsequently, the dust boot 1 will be described in more detail.

Figure 2:
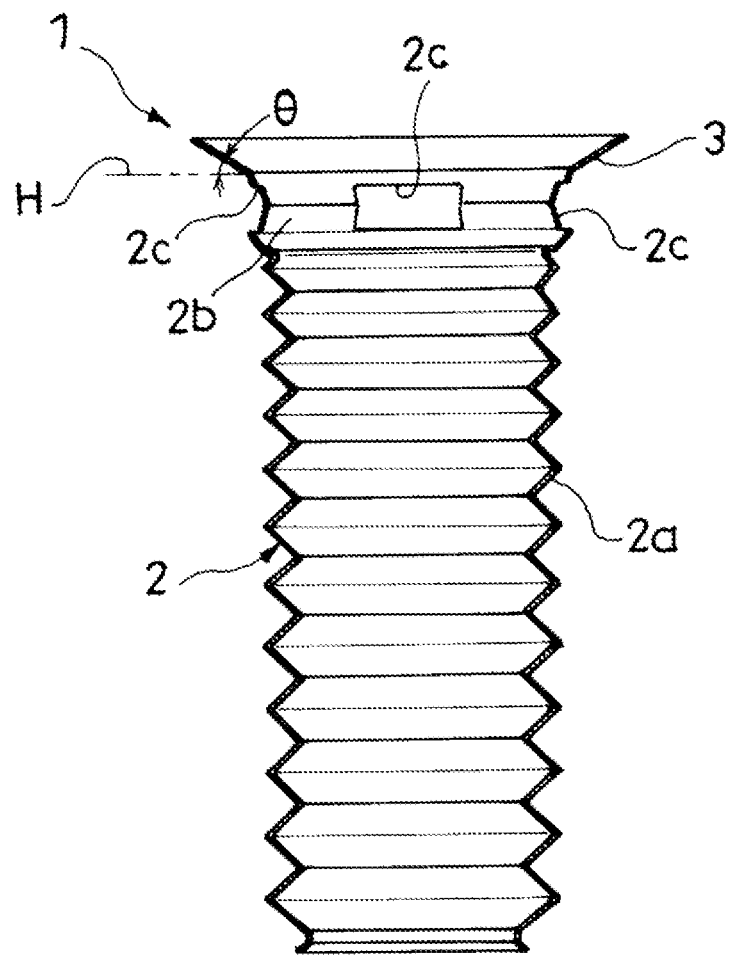
FIG. 2 is a vertically cross-sectional view illustrating the dust boot.

The dust boot 1 is formed of resin and has the boot body 2 and the flange portion 3 as illustrated in FIGS. 1 and 2. The boot body 2 has the bellows portion 2a and a tubular portion 2b provided in the upper end of the bellows portion 2a in FIG. 2. In addition, the tubular portion 2b is provided with four cutaway holes 2c arranged circumferentially at equal intervals.

The flange portion 3 has an annular shape and is linked to the upper end of the tubular portion 2b. In the outer side of the flange portion 3, an angle θ between the flange portion 3 and a horizontal line H perpendicular to the axis of the boot body 2 is set to 30° according to this embodiment.

The dust boot 1 is installed in the rod 5 by holding the flange portion 3 between the rod-side spring seat 6 and the suspension spring 8. When the flange portion 3 is held between the rod-side spring seat 6 and the suspension spring 8, the flange portion 3 is widened and pressed to match the seat portion 6b of the rod-side spring seat 6.

More specifically, according to this embodiment, the dust boot 1 is installed in the rubber seat 10 by inserting and fitting the tubular portion 2b into the rubber seat 10. The cutaway holes 2c are provided to face the protrusions 10d of the rubber seat 10.

Therefore, when the tubular portion 2b of the boot body 2 is inserted into the insertion 10a of the rubber seat 10, each protrusion 10d is fitted to each corresponding cutaway hole 2c. As a result, the dust boot 1 is installed in the rubber seat 10 in a retaining state. Note that the number of the protrusions 10d and the number of the cutaway holes 2c may be set to any number.

If the insertion 10a of the rubber seat 10 is fitted to the outer circumference of the inner tube 6a of the rod-side spring seat 6 while the dust boot 1 is placed, the rubber seat 10 tightly holds the inner tube 6a such that the tubular portion 2b is pressed to the inner tube 6a. As a result, the dust boot 1 is installed in the rod-side spring seat 6.

The flange portion 3 is interposed between the seat portion 10b of the rubber seat 10 and the seat portion 6b of the rod-side spring seat 6. If the suspension spring 8 installed with the rubber seat 10 is interposed between the rod-side spring seat 6 and the cylinder-side spring seat 7, the flange portion 3 is pressed to the seat portion 6b through the seat portion 10b by virtue of a spring force of the suspension spring 8. As a result, the flange portion 3 is fixed to the rod-side spring seat 6 while it tightly abuts on the seat portion 6b.

Alternatively, the rubber seat 10 may also be removed. However, using the rubber seat 10, it is possible to prevent a termination end of the suspension spring 8 from coming into direct contact with the flange portion 3 and allow the entire flange portion 3 to tightly abut on the seat portion 6b of the rod-side spring seat 6. Furthermore, it is possible to facilitate positioning of the dust boot 1 relative to the rod-side spring seat 6.

The lower end of the boot body 2 in FIG. 1 corresponding to the lower end of the dust boot 1 is fitted to the outer circumference of the bump stopper 9. Therefore, during an extending/contracting of the shock absorber 100 in which the rod 5 is vertically moved with respect to the cylinder 4 in FIG. 1, the dust boot 1 extends or contracts in response to the extension or contraction of the shock absorber 100 to cover the rod 5 at all times. As a result, it is possible to protect a sliding surface of the outer circumferential surface of the rod 5.

Subsequently, a process of manufacturing the dust boot 1 will be described.

Figure 3:
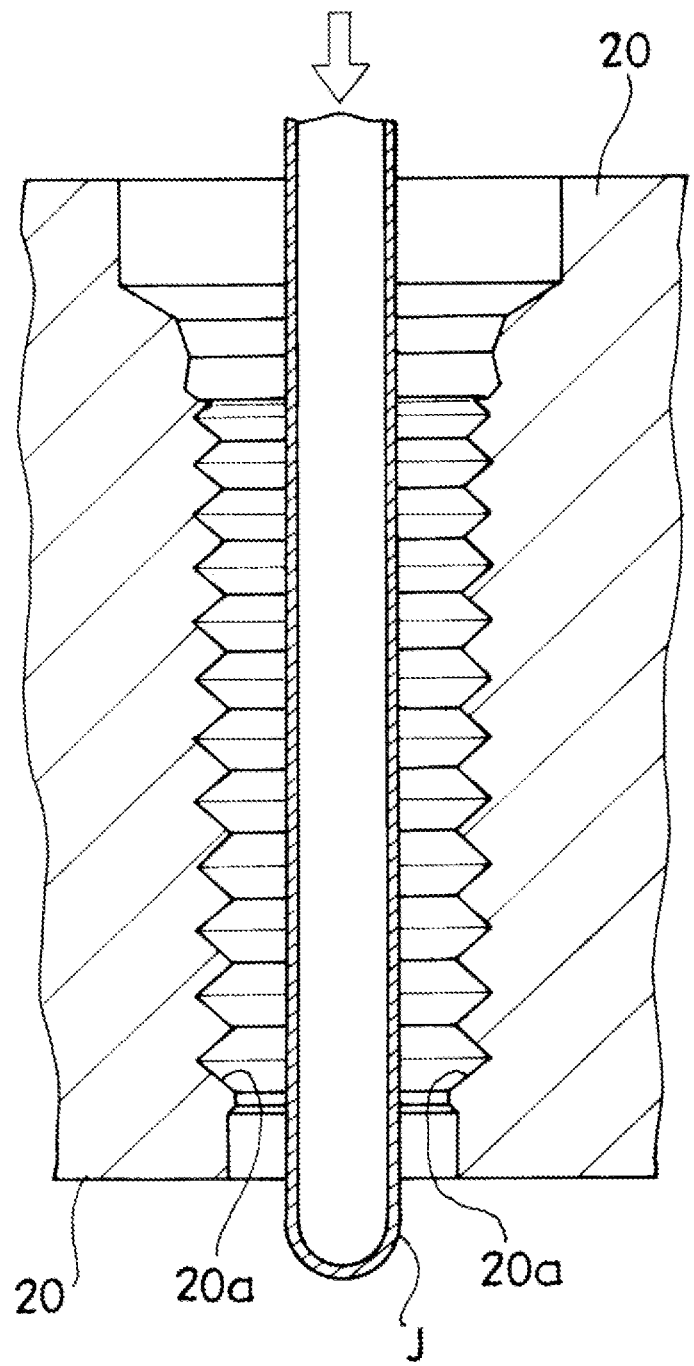
FIG. 3 is a diagram for describing a method of manufacturing the dust boot.

The dust boot 1 is manufactured through blow molding. A mold for manufacturing the dust boot 1 is divided into a pair of halves 20 and 20 as illustrated in FIG. 3. Inside the mold 20, recesses 20a are formed to match the shape of the dust boot 1 in order to mold both the boot body 2 and the flange portion 3 of the dust boot 1 at once.

A heated tubular resin material J is inserted into the mold 20, and air is blown inside of the resin material J to inflate it. As a result, the resin material J is pressed to the recesses 20a, so that the dust boot 1 is molded.

As described above, the flange portion 3 is linked to the boot body 2 at an angle of 30° with respect to the horizontal line H. For this reason, the amount of the resin material J used to form the flange portion 3 increases even by forming the dust boot 1 through the blow molding, compared to a case where the flange portion 3 has an angle of 0° with respect to the horizontal line H, that is, the flange portion 3 is in parallel with the horizontal line H. Therefore, it is possible to increase the thickness of the flange portion 3 enough to secure the strength.

In this manner, if the dust boot 1 is manufactured through blow molding by setting the angle between the flange portion 3 and the horizontal line H to be larger than 0° and smaller than 90°, it is possible to increase the thickness of the flange portion 3, compared to a case where the angle between the flange portion 3 and the horizontal line H is set to 0°. Therefore, it is possible to secure the strength of the flange portion 3.

In this regard, as the angle between the flange portion 3 and the horizontal line H approaches zero, deformation of the flange portion 3 widened to match the seat portion 6b of the rod-side spring seat 6 by holding the flange portion 3 between the rod-side spring seat 6 and the suspension spring 8 is reduced. For this reason, it is possible to facilitate an assembly work for holding the flange portion 3 between the rod-side spring seat 6 and the suspension spring 8. Meanwhile, the thickness of the flange portion 3 tends to decrease.

In contrast, as the angle between the flange portion 3 and the horizontal line H approaches 90°, deformation of the flange portion 3 widened to match the seat portion 6b of the rod-side spring seat 6 by holding the flange portion 3 between the rod-side spring seat 6 and the suspension spring 8 becomes serious. For this reason, an assembly work for holding the flange portion 3 between the rod-side spring seat 6 and the suspension spring 8 becomes difficult. Meanwhile, the thickness of the flange portion 3 tends to increase. This is advantageous in terms of the strength.

That is, a tradeoff relationship is established between the easiness of the assembly work and the strength of the flange portion 3. However, if the angle between the flange portion 3 and the horizontal line H in the outer side of the dust boot 1 is set to be 30° and larger and 60° or smaller, it is possible to secure both the easiness of the assembly work for holding the flange portion 3 between the rod-side spring seat 6 and the suspension spring 8 and the strength of the flange portion 3. That is, it is possible to guarantee both the easiness of the assembly work and the strength of the flange portion 3.

As described above, in the dust boot 1 according to this embodiment, the angle between the flange portion 3 and the horizontal line is set to be larger than 0° and smaller than 90°. As a result, it is possible to secure the thickness of the flange portion 3 even by forming the dust boot 1 through blow molding. Therefore, it is possible to employ inexpensive blow molding in manufacturing of the dust boot 1 while securing the strength.

Using the method of manufacturing the dust boot 1 according to this embodiment, it is possible to employ inexpensive blow molding in manufacturing of the dust boot 1 while securing the strength.

In addition, the shock absorber 100 according to this embodiment has the dust boot 1 manufactured through inexpensive blow molding while securing the strength. Therefore, it is possible to manufacture the shock absorber 100 at a low cost as well.

Embodiments of this invention were described above, but the above embodiments are merely examples of applications of this invention, and the technical scope of this invention is not limited to the specific constitutions of the above embodiments.

This application claims priority based on Japanese Patent Application No. 2014-67925 filed with the Japan Patent Office on Mar. 28, 2014, the entire contents of which are incorporated into this specification.

The invention claimed is:

1. A method of manufacturing a dust boot for a shock absorber, the shock absorber comprising:
   a cylinder;
   a rod configured to move into and out of the cylinder;
   a rod-side spring seat installed in the rod;
   a cylinder-side spring seat installed in the cylinder;
   a suspension spring interposed between the rod-side spring seat and the cylinder-side spring seat; and
   the dust boot,
   wherein the dust boot has
      a tubular boot body provided with an extendable/contractible bellows portion to cover the rod, and
      an annular flange portion linked to an upper end of the boot body and held between the rod-side spring seat and the suspension spring,
   wherein the shock absorber further comprises a rubber seat installed in an upper end of the suspension spring and interposed between the flange portion and the suspension spring, and
   wherein an angle between the flange portion and a line perpendicular to an axis of the boot body in an outer side of the flange portion is set to be larger than 0 degrees and smaller than 90 degrees,
   said method comprising:
      forming both the boot body and the flange portion through blow molding.

2. The method of claim 1, the method comprising:
   inserting a tubular resin material into a mold for integrally molding the boot body and the flange portion; and
   blowing gas into the resin material to press the resin material to the mold in order to form the dust boot.

3. The method of claim 1, wherein
the angle is set to 30 degrees or larger and 60 degrees or smaller.

4. A shock absorber, comprising:
a cylinder;
a rod configured to move into and out of the cylinder;
a rod-side spring seat installed in the rod;
a cylinder-side spring seat installed in the cylinder;
a suspension spring interposed between the rod-side spring seat and the cylinder-side spring seat; and
a dust boot,
   wherein the dust boot has
      a tubular boot body provided with an extendable/contractible bellows portion to cover the rod, and
      an annular flange portion linked to an upper end of the boot body and held between the rod-side spring seat and the suspension spring,
   wherein an angle between the flange portion and a line perpendicular to an axis of the boot body in an outer side of the flange portion is set to be larger than 0 degrees and smaller than 90 degrees, and
   wherein the shock absorber further comprises a rubber seat installed in an upper end of the suspension spring and interposed between the flange portion and the suspension spring.

5. The shock absorber according to claim 4, wherein
the boot body has a cutaway hole, and
the rubber seat has a protrusion fitted to the cutaway hole.

* * * * *